United States Patent [19]

Eng et al.

[11] 4,289,810
[45] Sep. 15, 1981

[54] IN-SITU CAVITY COATING METHOD

[75] Inventors: King D. Eng, Fishkill, N.Y.; John T. Brandenburg, Port Neches, Tex.; Kung-You Lee; Matthew A. McMahon, both of Wappingers Falls, N.Y.

[73] Assignee: Texaco Inc., White Plains, N.Y.

[21] Appl. No.: 78,869

[22] Filed: Sep. 26, 1979

[51] Int. Cl.³ .................. B05D 7/22; B05D 3/02
[52] U.S. Cl. .................. 427/230; 427/235; 427/239; 427/244
[58] Field of Search ............ 427/230, 235, 239, 244

[56] References Cited
U.S. PATENT DOCUMENTS 4,048,352 9/1977 Pignocco et al. ............ 427/239 X Primary Examiner—James R. Hoffman
Attorney, Agent, or Firm—Carl G. Ries; Robert A. Kulason; Robert B. Burns

[57] ABSTRACT

Method for the in-situ deposition of a coating onto internal surfaces and matrix substrates of a body which defines one or more cavities. The single cavity, or the respective cavities packed with suitable substrates are provided with a predetermined amount of a solid reacting component to produce a suitable coating. The cavity is furnished with a liquid component which contacts the solid component, thereby forming a desired liquid coating reaction mixture. The latter is brought into contact with the cavity walls as well as with materials contained within the cavity, to achieve the desired coating of walls and matrix material.

11 Claims, 3 Drawing Figures

U.S. Patent
Sep. 15, 1981
4,289,810
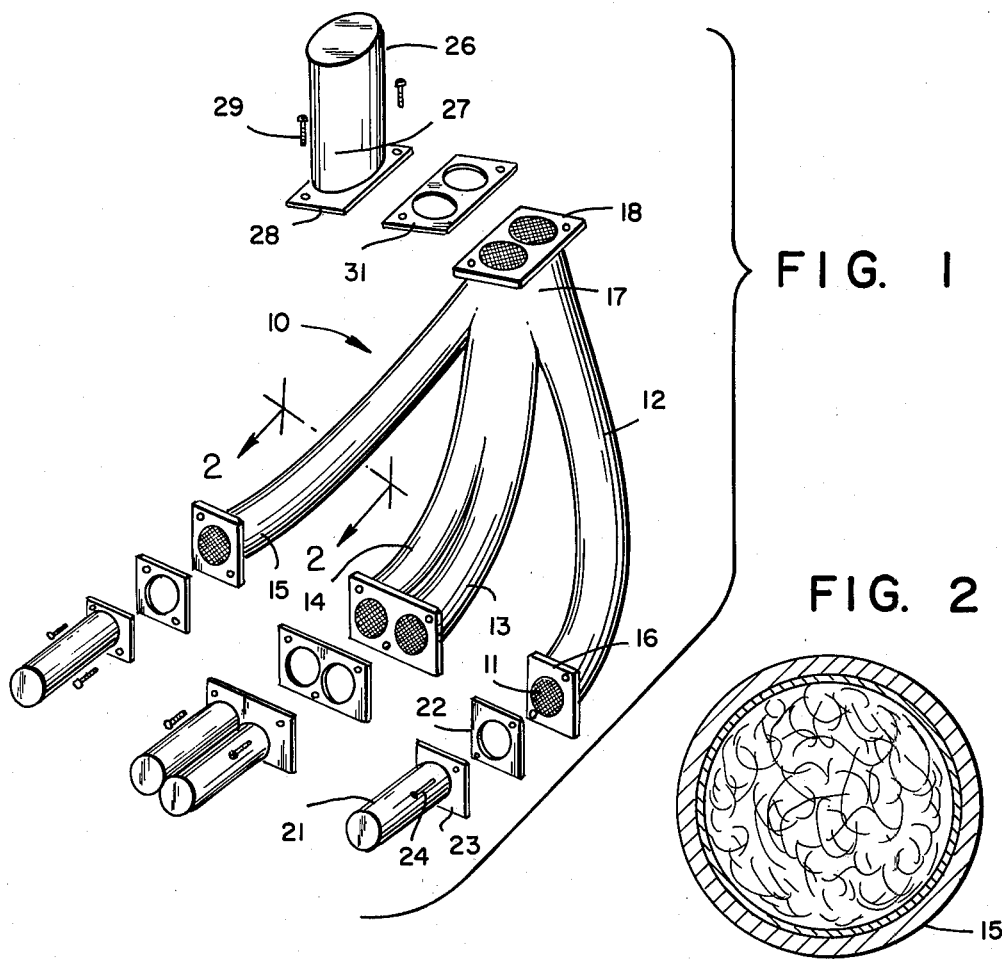
FIG. 1
FIG. 2
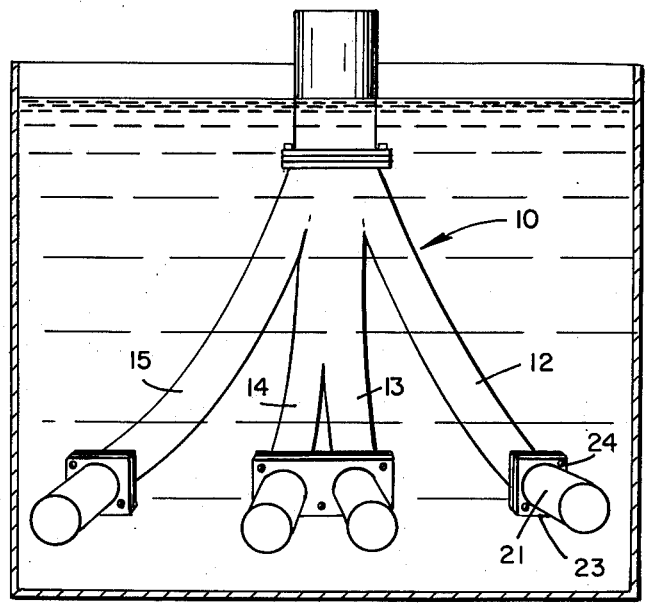
FIG. 3

IN-SITU CAVITY COATING METHOD

BACKGROUND OF THE INVENTION

The art of coating a layer of material onto a substrate to achieve certain characteristics in the material, is used in many industries and fields of commerce. One procedure for coating such an article resides essentially in depositing a layer of the desired material across the surface, or part of a surface of the object being coated. Normally the deposited layer is sufficiently thin as to not add substantially to the thickness of the entire surface. However, the coated area will possess characteristics that are essential to the desired function or operation of the object being coated.

As an example of the coating process, in the automotive art certain exhaust gas filters and reactors are provided with a catalytic material or a substance adapted to promote reaction of the exhaust gas. This reaction is followed with the intention of treating the gas prior to its discharge into the atmosphere. Usually for such an article as an exhaust gas filter, the entire unit is dipped or immersed into a bath of coating solution. The unit is then maintained at a desired temperature to best achieve deposition of the coating material.

Generally, in such a process there are a number of factors to be considered for the filter's coating layer to be properly applied and held to the inner surface. Primarily, the coating ingredients must be brought to, and maintained at an optimum concentration and strength. Further, during the coating process, the solution's strength should be maintained by the periodic addition thereto of amounts of the coating elements as the latter leaves the solution to form the coating.

Also, it is desirable to maintain the applied layer at a relatively uniform thickness. This latter requirement, however, becomes difficult in the instance of objects or articles which are of an irregular shape or configuration. Lack of layer uniformity will result for example when the solution does not contact all exposed surfaces for the same period of time.

As is well known, to achieve a proper coating or layer, it is necessary to maintain the coating solution within a preferred temperature range, and to sustain the process over a set period of time.

As mentioned above, a primary defect or fault normally encountered in this type of coating process resides in the shape of the object being coated. Normally, the article is simply dipped into a bath such that it is immersed and consequently all exposed and wetted surfaces in contact with the reacting materials will become coated. Such a process however, could require the removal of excess coating material from certain surfaces that have been exposed to the solution but do not require coating. This latter step of course adds to the overall cost, and the time involved in producing the product.

Other limitations normally embodied in the coating process reside in the capacity of the coating bath to accommodate a limited number of articles. This facet also leads to the problem of irregularity of the coating. Notably, all exposed surfaces will not necessarily be subjected to the same degree of contact time with the solution even though they are completely immersed in the latter.

Toward overcoming these above stated problems as well as to provide a commercially acceptable coating method, the following method is provided. The method herein disclosed is addressed primarily to the coating of irregularly shaped members which normally define an internal filled or unfilled cavity, into which a uniform coating is difficult to apply and for which the coating needs to be restricted to the inside walls of the unit. The term "matrix" as herein used, refers to a bed or mass of a mesh-like material such as steel wool. The function of the latter is to contact the gas for prompt treatment.

Thus, the article, although irregular in shape, and filled with matrix substrate material, is nonetheless adapted to be sealed such that the internal cavity can be made liquid tight. To achieve the in-situ coating, the cavity or cavities will also have previously been provided with separate charges of unmixed solid and liquid components which make up the coating composition. Said components are thereafter mixed, and react to form a coating solution. When said solution is caused to contact the internal cavity walls and matrix, such surfaces will receive a deposit of the coating element.

To achieve the proper degree of such internal coating, each article in sealed condition, can be immersed in a bath or other temperature controlled medium. In the latter, the article is maintained over a period of time, exposed to the solution at a prescribed temperature.

It is therefore an object of the invention to provide a novel method for depositing a uniform coating layer onto an inner substrate surface. A further object is to provide a method for in-situ coating of discrete surfaces of an irregularly shaped article. A still further object is to coat the inner surfaces, including a matrix contained therein, of an exhaust gas manifold or filter.

BRIEF DESCRIPTION OF THE DRAWING

In the drawing,

FIG. 1 represents an exploded view of the article to be coated, with the various closure members detached.

FIG. 2 is a cross sectional view taken along line 2—2 of FIG. 1.

FIG. 3 illustrates the article being internally coated while immersed in a heating bath.

To illustrate the novel method, a coating as hereinafter disclosed, is applied to inner surfaces of a manifold member 10 of the type normally used in conjunction with an internal combustion engine. The manifold as shown, is provided with means for removably engaging the block of a four cylinder engine. When so positioned it receives four distinct exhaust gas streams, each of which is discharged from an engine combustion chamber.

Said manifold 10 is provided with a plurality of internal beds 11 adapted for contacting and treating hot exhaust gases. Thus, the manifold comprises four elongated, tubular arms or segments 12, 13, 14 and 15. The end of each segment, such as 12, is provided with a flange 16 which is shaped to fasten to a corresponding flange or surface at the engine block. Thereafter the flow of hot exhaust gas will pass from the engine block, into manifold 10, and thence to a muffler or a gas treating unit.

The respective elongated manifold segments or arms are sufficiently curved to be attached to the block at space apart locations. Further, they are brought together at a juncture to form a common gas stream within manifold body 17. The latter is likewise provided with a connecting flange 18. Body 17 is internally structured to concurrently receive the four separate arms and gas flows, and can be shaped at its outlet to further direct the gases in a desired direction.

To enhance the efficiency of any gas treating unit connected downstream of manifold 10, the hot exhaust gas can be pretreated while still within the manifold. Thus, and as here shown, the respective manifold arms 12, 13, 14 and 15 are each provided with a bed 11 or mass of a packing material which defines a gas pervious section.

Physically, bed 11 can comprise any one of a number of shapes and configurations to achieve the desired function. Here, the bed is formed of steel or alloy wool in a manner to define passages capable of guiding and contacting the hot gas passing therethrough. Further, to promote the gas treating or catalytic effect, the exposed surfaces of bed 11 as well as those of the cavity which confines the bed 11, are provided with a suitable coating of alumina. The latter can comprise for example, a coating of alumina which provides a catalytic effect and to which can be added other catalysts by solution impregnation or other means.

Operationally, as hot exhaust gas flows through the respective manifold arms 12 to 15, the gas will be contacted and react with the alumina or other catalyst which is disposed along the bed 11 surfaces. Bed 11 can extend for only a portion of the arm's length; however it preferably extends the entire length of the arm and is retained in place by any suitable means. The bed thereby has ample opportunity to be contacted by the hot, flowing exhaust gas.

As previously noted it is desirable to apply the uniform thickness of the catalytic material or coating layer only to the manifold 10 inner walls or the cavity formed in the respective arms. Thus, each cavity as defined by a manifold arm, is exposed to a solution of comparable concentration as are other cavities. Further, the time of exposure, as well as the temperature of the coating solution are readily maintained at a relatively uniform level.

After the packing material or bed 11 has been positioned within each manifold arm such as 12, a canister or container 21 is removably fastened to each arm flange 16. To achieve a liquid tight joint, a resilient gasket 22 can be pressed between arm flange 16 and the corresponding flange 23 of canister 21. The respective flanges are held in fluid tight engagement about gasket 22 by two or more bolts 24 which pass through the respective flanges and are drawn tight.

To achieve a desired concentration of the coating solution in each arm 12 to 15, the container 21 which is adapted to a particular arm, is provided with a quantity or solid charge of aluminum pellets. These pellets are provided in a predetermined amount sufficient to coat the walls of the cavity as well as the various passages of the bed 11 disposed within the arm cavity.

In the present arrangement, the respective arms 12 to 15 are of substantially equal lengths and consequently will have equal areas of internal coating surface. Thus, the amount of aluminum pellet charge which is provided in the respective canisters 21 will be substantially equal. However, should there be variations in the coating surfaces of the respective arms, the volume of aluminum pellet charge will be commensurably proportioned for each of said arms.

The respective canisters 21 are preferably fastened onto the manifold arms, with the manifold positioned in a way that the canisters will be at the manifold's lowest point or points. Thereafter, alkali hydroxide which is introduced to manifold 10 to form the coating slurry or mixture, will gravitate downwardly and into the canisters and react with the aluminum pellets.

The coating operation is carried out with manifold 10 in a substantially liquid tight condition. It is understood, however, that the manifold interior is vented to release gas which is generated during the process.

The alkali liquid is added to the cavity by means of a suitable container 26 or similar receptacle which includes a flange 28 that attaches to flange 18. As in the previous instance, the flanges are brought together with a gasket compressed therebetween to assure a liquid tight seal.

Container 26 includes a body 27 that can be internally channelled to define separate passages for each of the respective arms 12 to 15. However, the container can also be provided with an external attachment adapted to receive a hose or conduit for metering liquid.

Functionally, manifold 10 can be initially disposed to place the liquid holding container 26 at the lowest point. Thereafter, the manifold is adjusted to prompt forming of the coating slurry. Thus, container 26 is fastened in position with bolts 29. The amount of liquid retained in said container is proportioned to mix with the solid aluminum pellets, and thereby form a desired concentration for optimum coating rates.

In the instant example, a sufficient amount of one molar sodium aluminate was added to react with the aluminum pellets, and form a desired solution concentration.

When the manifold is optionally placed into the temperature controlled heating medium, the sodium aluminate will gravitate downwardly and into the respective canisters 21 to meet aluminum and form the alumina coating. To best foster the coating process, the water bath, if utilized, is maintained at a temperature of 180° F.

With the coating solution thus formed manifold 10 can be fixedly positioned or it can be articulated to prompt flowing of the solution or slurry about the cavity and bed. However, the normal reaction, as well as the upward flow of $H_2$ gas also prompts circulation of the solution.

Thereafter, when the coating period has terminated, the manifold is removed from the heating bath. After removal of the respective container 26 and canister 21, the unit is calcined at 700° to 1,000° F. and is in condition for use.

The resulting manifold with coated matrix or bed is now in condition to be used as a filter, or a particle trap for treating particle laden exhaust gas as would be the instance particularly in diesel engines.

Other modifications and variations of the invention as hereinbefore set forth can be made without departing from the spirit and scope thereof, and therefore, only such limitations should be imposed as are indicated in the appended claims.

We claim:

1. Method for depositing a coating layer of material onto interior surfaces of a body which defines an internal cavity having a gas pervious matrix substrate substantially occupying said cavity, the latter having at least one opening, which method includes the steps of:
    initially inserting into said internal cavity a charge comprising a solid reaction component which, when mixed with a sufficient amount of a liquid component, will form a liquid coating solution having a desired molar concentration, closing said at least one cavity to form a vented, liquid holding chamber within the cavity, introducing into said liquid holding cavity said sufficient amount of liquid component to contact said reaction component thereby to form the coating composition having the desired molar concentration, and maintaining said coating composition within said cavity for a sufficient period of time to deposit a coating layer on surfaces within the cavity.

2. In the method as defined in claim 1, wherein said solid charge component is deposited at the lowest point within said internal cavity.

3. In the method as defined in claim 1, including the step of; maintaining said body at a predetermined temperature to facilitate the deposition of said coating layer onto said cavity walls.

4. In the method as defined in claim 1, including the step of; moving said body about to prompt flowing of the coating solution subsequent to the formation of the coating solution, to cause said coating solution to contact said matrix and said cavity walls.

5. In the method as defined in claim 1, including the step of; immersing said body into a liquid bath at a sufficient temperature to facilitate the deposition of said coating layer onto exposed surfaces within said cavity.

6. In the method as defined in claim 1, including the step of; draining said coating solution from said cavity subsequent to said coating layer being deposited onto walls within said cavity.

7. In the method as defined in claim 6, including the step of; calcining said coated matrix-containing body at an elevated temperature.

8. In the method as defined in claim 7, wherein said matrix-containing body is calcined at a temperature within the range of about 600° to 1,000° F.

9. In the method as defined in claim 1, wherein; said initially inserted solid charge comprises a plurality of discrete charge units disposed at different positions about the lowermost parts of said cavity.

10. In the method as defined in claim 1, wherein; said initially inserted solid charge is retained within a container having an access opening, said container being removably attached to said body at said at least one opening, to communicate said cavity with said container.

11. In the method as defined in claim 1, wherein; said body includes; a plurality of separate branches, each thereof defining a discrete minor cavity, and said method includes the step of inserting into each of said minor cavities an amount of said soluble component in proportional amount commensurate with the surface area to be coated.

* * * * *